(12) United States Patent
Dermer et al.

(10) Patent No.: US 6,366,361 B1
(45) Date of Patent: *Apr. 2, 2002

(54) PEEKER DETECTION AND CORRECTION

(75) Inventors: Richard Dermer, Issaquah, WA (US); Douglas R. Becker, Ayer, MA (US); Dennis Mercer, Auburn, NH (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,781

(22) Filed: Sep. 3, 1997

(51) Int. Cl.[7] .............................................. G06K 15/00
(52) U.S. Cl. ........................... 358/1.9; 358/1.2; 358/1.1
(58) Field of Search ................................. 395/109, 116; 382/294, 167, 199; 345/431; 358/1.1–1.9, 1.11–1.18, 518, 525, 527, 531, 530, 540

(56) References Cited

U.S. PATENT DOCUMENTS

| | | | | |
|---|---|---|---|---|
| 4,931,861 A | * | 6/1990 | Taniguchi | 382/167 |
| 5,295,236 A | | 3/1994 | Bjorge et al. | 395/134 |
| 5,313,570 A | * | 5/1994 | Dermer et al. | 382/294 |
| 5,542,052 A | * | 7/1996 | Deutsch et al. | 345/431 |
| 5,579,405 A | * | 11/1996 | Ishida et al. | 382/199 |
| 5,602,976 A | | 2/1997 | Cooper et al. | 395/116 |
| 5,613,046 A | * | 3/1997 | Dermer | 395/109 |
| 5,638,498 A | | 6/1997 | Tyler et al. | 395/117 |
| 5,666,543 A | * | 9/1997 | Gartland | 395/116 |
| 5,668,931 A | * | 9/1997 | Dermer | 395/109 |

FOREIGN PATENT DOCUMENTS

| | | |
|---|---|---|
| EP | 0 618 718 A1 | 5/1994 |
| WO | WO 95 20796 A1 | 3/1995 |

* cited by examiner

Primary Examiner—Dov Popovici
Assistant Examiner—King Y. Poon
(74) Attorney, Agent, or Firm—Fish & Richardson P.C.

(57) ABSTRACT

Method and apparatus for rasterizing a resolution-independent page description for printing. A peeker (gap between two visible edges in vector representation that is narrower than a printer pixel) is identified between a first visible edge and a second visible edge, and a color adjustment is made to at least one of the edges. In one embodiment, a side of the second visible edge facing a side of the first visible edge is identified. The color of the identified side of the first visible edge is changed based on the color of the identified side of the second visible edge. The color adjustment is advantageous in connection with methods of trapping.

20 Claims, 16 Drawing Sheets

PEEKER DETECTION AND CORRECTION

BACKGROUND OF THE INVENTION

The invention relates to modifying a color page described in a page description language so that the page can be correctly trapped.

In the printing industry, press registration is the accurate positioning of two or more colors of ink on a printed sheet. When the colors on a sheet are in register, all colors appear precisely where intended, without gaps between colors or overlap of colors. Misregistration can be caused by a number of factors, including errors in platemaking and film handling prior to platemaking, poorly-maintained printing presses or poorly-trained operators, paper inaccuracy or instability, and lack of environmental controls. One result of misregistration is unprinted paper showing through between colors, where no unprinted area was intended. Even a small registration error can result in a thin white line showing between colors on a sheet.

Trapping is the process of compensating for press misregistration by intentionally overlapping colors prior to printing. For example, a spread expands the color of a foreground image to overlap with the background color. Conversely, a choke enlarges the background color to overlap with the foreground image. The area of color added to create overlap, called a trap, provides a degree of protection against gaps created by misregistration. Although the trap color may be the same as the background or foreground color, it need not be. Trapping involves deciding where to place traps, and setting the size and color of traps so as to correct for possible misregistration while being minimally noticeable to the human eye.

It is conventional in the electronic publishing industry to design pages using a page description language (PDL), such as the Adobe® PostScript® language, to describe a page using resolution-independent elements. In PostScript, a path is a collection of ordered directed connected straight line segments, referred to as edges. A path, which appears as a shape on the page, must be closed. Each edge in a path has a "from point" and a "to point" which define the position and direction of the edge. The to point of an edge in a path is the same point as the from point of the subsequent edge in the path, and the to point of the last edge in the path is the same point as the from point of the first edge in the path. Edges in a path may intersect.

An object may consist of one or more paths, all filled or stroked in a single color. An object has a unique sequence number, also referred to as a z-order or paint order, that is shared by each of the paths in the object. The sequence number of an object specifies when the object will be drawn on the page in relation to other objects. The object with the lowest sequence number will be drawn first, followed by the object with the next lowest sequence number. This sequential drawing of objects may result in one object being partially or entirely occluded by other objects with higher sequence numbers.

To render a PostScript page (by which is meant a PostScript language description of a page) on an output device such as a printer, the page must first be rasterized, that is, the vector representation of the page must be converted into a two-dimensional array of pixels. The resolution of an output device is defined by the number of pixels on the output medium of the output device per unit distance or per unit area.

A PostScript page description may be analyzed to produce a new PostScript page description which contains traps. The new PostScript page description may then be used to render the page, with traps, according to conventional methods. Alternatively, the PostScript page may first be rasterized, after which traps are generated in rasterized form by analyzing the rasterized page.

SUMMARY OF THE INVENTION

A peeker is a gap between two edges in vector representation that is narrower than a device pixel at the resolution of the output device on which the vectors are to be rendered. The invention modifies a vector image to be rendered in rasterized form, so that traps may be correctly generated wherever peekers exist. In particular, the invention corrects vector space color transitions so that they match color transitions in rasterized form.

In one aspect, the invention prepares a resolution-independent representation of a region for trapping. Specifically, a peeker is found between a first edge in the region and a second edge in the region, and an abutting color that will abut a side of the first edge between the first edge and the second edge when the first edge is rendered in rasterized form is identified. The color of the first edge on the side of the first edge between the first edge and the second edge is then changed to the abutting color. The region is then trapped and rendered on an output device, such as a printer.

In another aspect, the invention identifies an exterior color of a resolution-independent edge in a path based on information derived from the interior colors of other edges in other paths. The exterior color so identified may then be advantageously used in peeker detection and color correction, and in trapping.

Among the technical advantages of the invention are one or more of the following.

One advantage of the invention is that it performs peeker color correction on objects while they are in vector form, prior to rasterization. This provides a basis for more accurate positioning of traps than trapping based on the rasterized page by itself. Also, because the invention provides a basis for resolution-independent trapping, pages which are trapped according to the invention may be rendered at a number of resolutions without the need for re-trapping.

A further advantage of the invention is that use of the vector representation preserves information about objects that is lost during rasterization, allowing more complete and varied processing of the edge table.

Furthermore, vector space is a more efficient representation of the rendered appearance of an area than raster space; a color transition many hundred pixels in length can be described in one small data structure in vector form. This storage efficiency is critical to obtaining high throughput and efficient trapping performance.

Other features and advantages of the invention will become apparent from the following description and from the claims.

DETAILED DESCRIPTION

Figure 1:
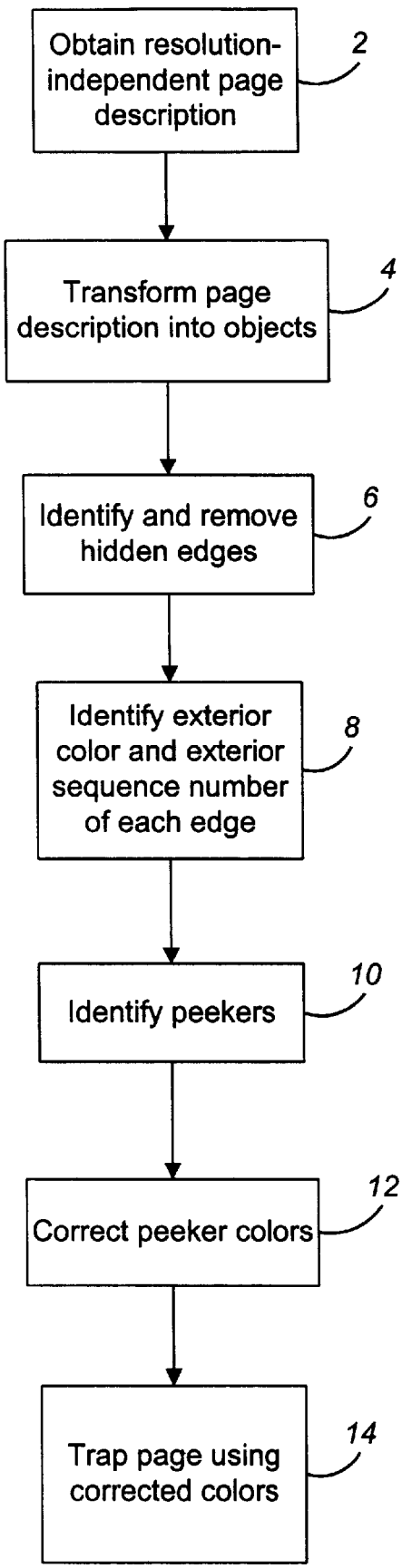
FIG. 1 is a flow diagram of a method of the invention.

Referring to FIG. 1, a method for trapping a PDL page detecting and correcting peeker colors of the invention first obtains a resolution-independent description of a page (e.g., in PostScript format) (step 2), and then transforms the page description into a list of objects (step 4). The method then identifies and removes hidden edges from the page (step 6), and identifies the exterior color and exterior sequence number of each edge on the page (step 8). The method next identifies peekers using the vector representation of the objects on the page and information about the resolution at which the page will be rendered in rasterized form on an output device (step 10).

Then, the method changes the exterior color of each edge at which a peeker exists to the color which will abut the exterior side of the edge when rendered on the output device (step 12). This changes the color transitions between edges in vector space so that they match the color transitions between edges in rasterized form.

Finally, trapping is performed on the page, using the corrected color information, using any of a variety of trapping methods (step 14).

The method of FIG. 1 is now described in more detail.

Figure 2A:
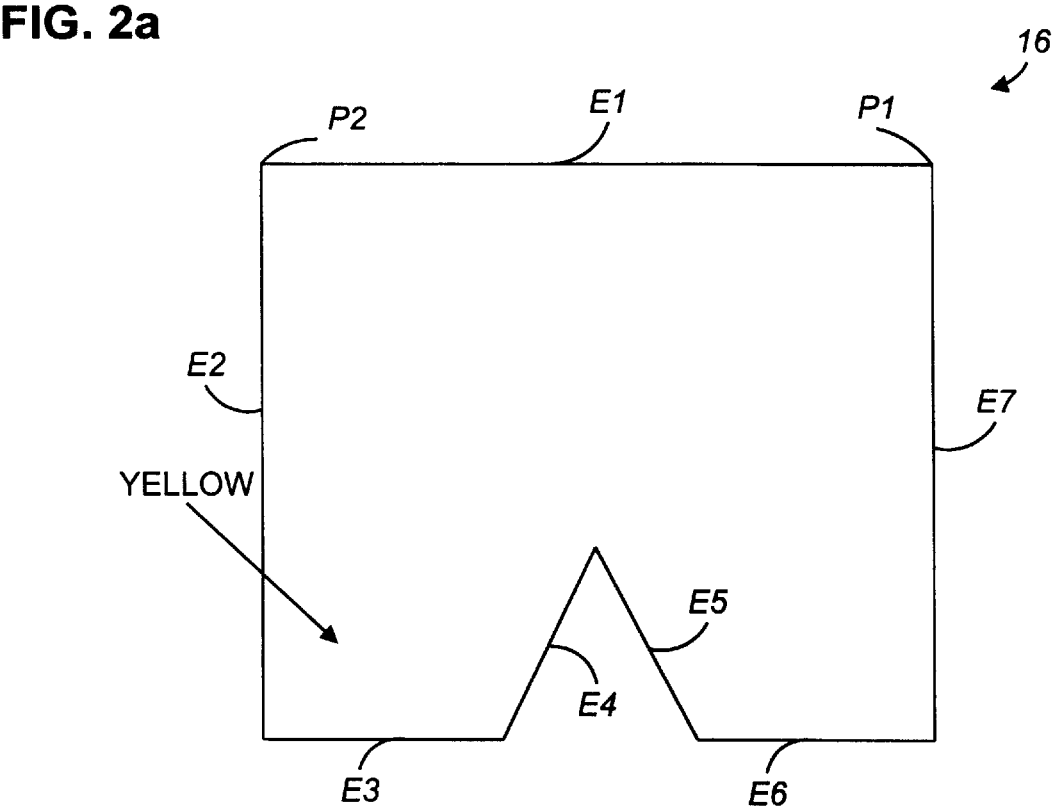
FIGS. 2a–2b are diagrams of PostScript paths.

Referring to FIG. 2a, a PostScript path 16 has ordered edges E1, E2, E3, E4, E5, E6, and E7. The first edge E1 has a from point P1 and a to point P2. The remaining edges, similarly, have from and to points which define the shape of the path 16 in a counter-clockwise direction, ending at point P1. As each edge of path 16 is traced from its from point to its to point, the interior of path 16 is defined to be on the left side of the edge; the exterior of path 16 is defined to be on the right side of the edge. Each edge in path 16 has an interior color that specifies the color on the interior (left) side of the edge. The interior color of each edge of path 16 is yellow, causing the interior of path 16 to appear yellow when rendered on an output device.

Figure 2B:
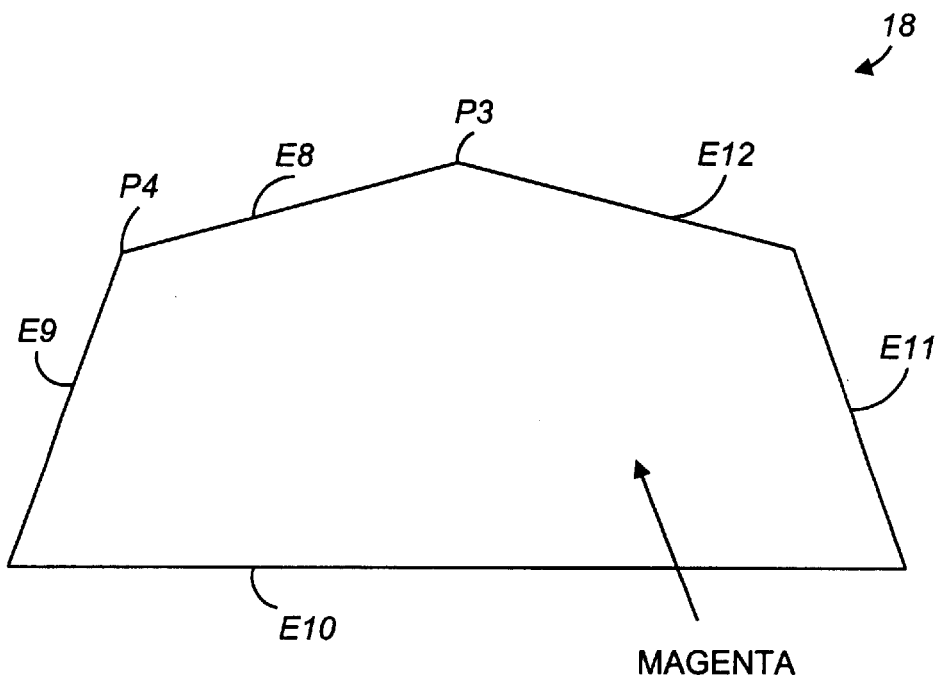

Referring to FIG. 2b, a PostScript path 18 has ordered edges E8, E9, E10, Ell, and E12. The first edge E8 has a from point P3 and a to point P4. The remaining edges, similarly, have from and to points which trace the path 18 in a counter-clockwise direction, ending at point P3. The interior color of each edge is magenta, causing the interior of path 18 to appear magenta when rendered on an output device.

Figure 2C:
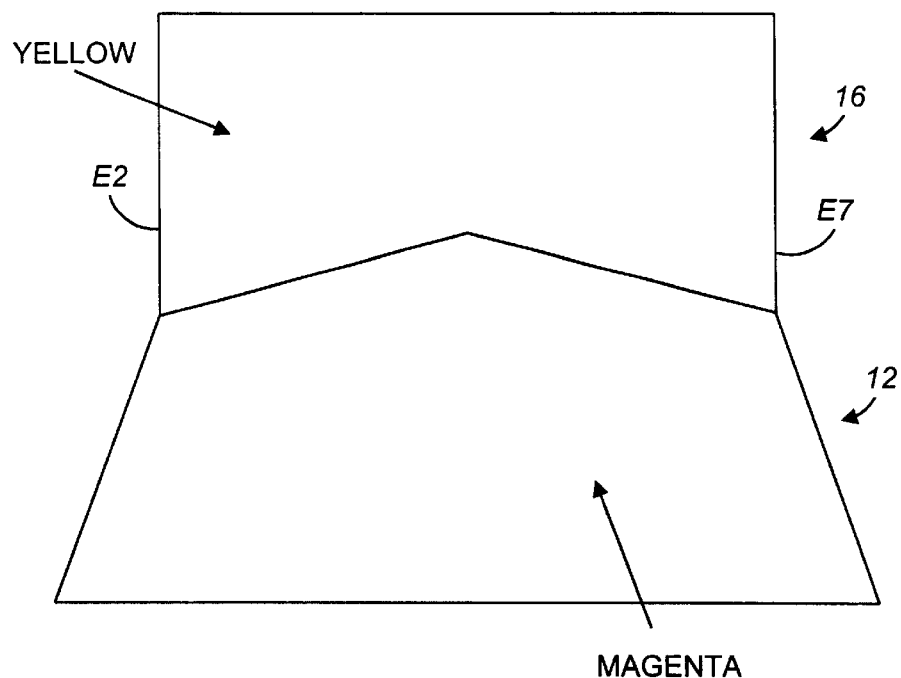
FIG. 2c is a diagram of a PostScript path partially occluding another PostScript path.

Objects on a PostScript page may overlap. Therefore, some object edges may be obscured by other objects and may therefore not be visible when the page is rendered on an output device. If path 18 has a higher sequence number than path 16, then the paths will appear as shown in FIG. 2c when rendered by an output device. As shown in FIG. 2c, part of the interior region of path 16 is occluded by part of the interior region of path 18. Edges E3, E4, E5, and E6 of path 16 are entirely occluded by path 18, and parts of edges E2 and E7 of path 16 are occluded by path 18.

A PostScript page is transmitted to a PostScript-capable device, such as a PostScript printer or imagesetter. A trapping engine transforms the PostScript page into a set of objects appearing on the page, using conventional methods. Each object consists of one or more paths sharing a common unique sequence number.

Each edge in a path has a number of attributes. Each edge has a from point and a to point, which define the position and direction of the edge. The original interior color and effective interior color of an edge are initialized to the value of the interior color of the edge. The owning or interior sequence number of an edge is the sequence number of the path to which the edge belongs. The original exterior color, effective exterior color, and exterior sequence number of an edge are described below. A child edge (described below) also contains a reference to the child edge's parent edge.

After the trapping engine transforms the PostScript page into a set of objects, the page is divided into small rectangular tiles. Although the invention will be described as operating on such tiles, it may also operate on a page which has not been divided into tiles. Each tile boundary has a from point, a to point, and an interior color.

Figure 3A:
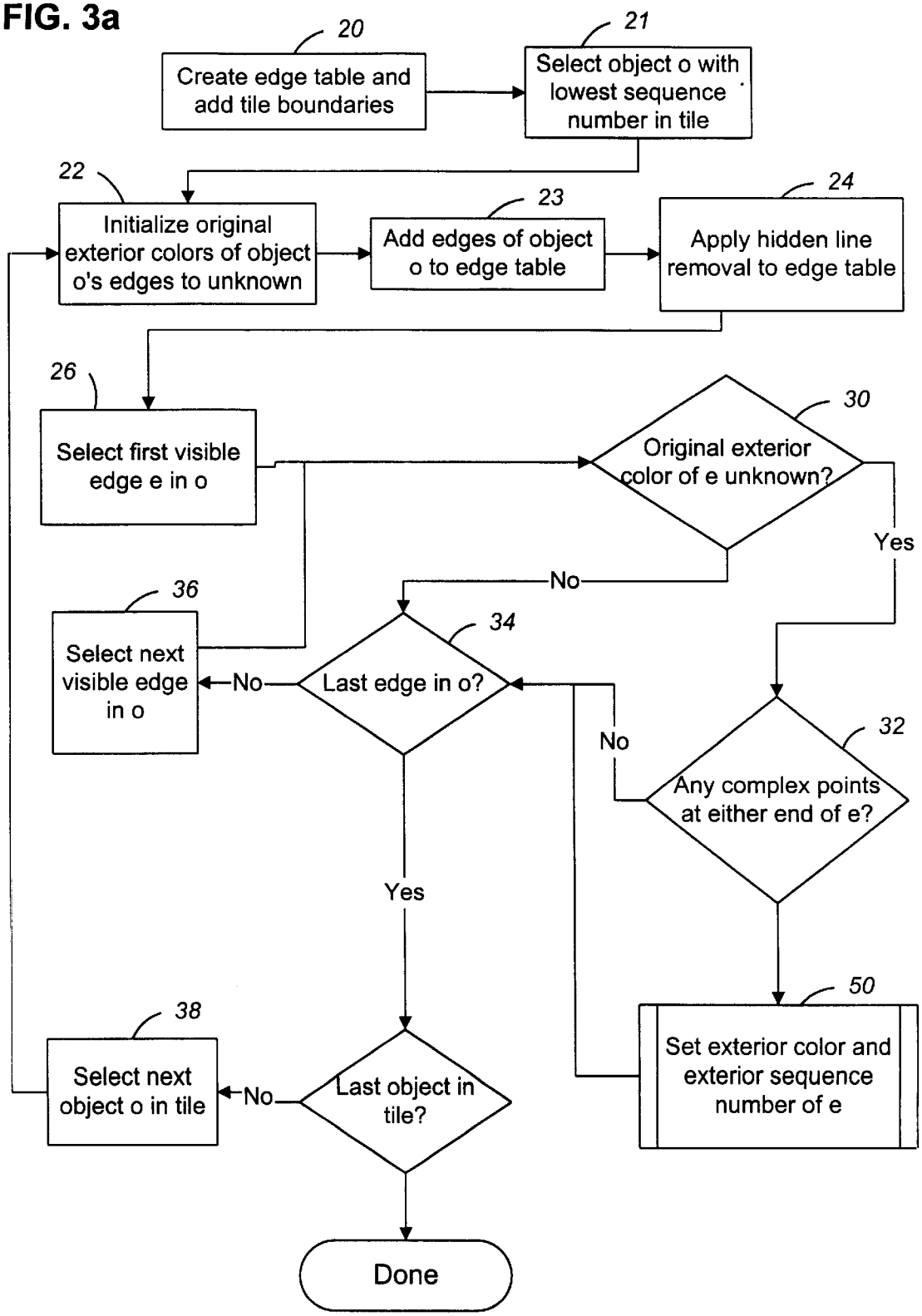
FIGS. 3a–3c are flow diagrams of methods used to identify the exterior colors and exterior sequence numbers of edges within a tile.

The edges in a tile which will be visible when the page is rendered are recorded in an edge table. Referring to FIG. 3a, the trapping engine creates an empty edge table for a tile and adds the tile boundaries of the tile to the edge table (step 20). Next, the object o with the lowest sequence number in the tile is selected (step 21), and the original exterior colors of object o's edges are initialized to a value of unknown. The edges of object o are then added to the edge table (step 23).

A hidden line removal method is then applied to the edge table. The hidden line removal method splits each edge in the edge table into two smaller edges at each point at which the edge intersects an edge of another object. Each edge resulting from a split inherits the original interior color and interior sequence number of the edge from which it was derived.

Figure 2D:
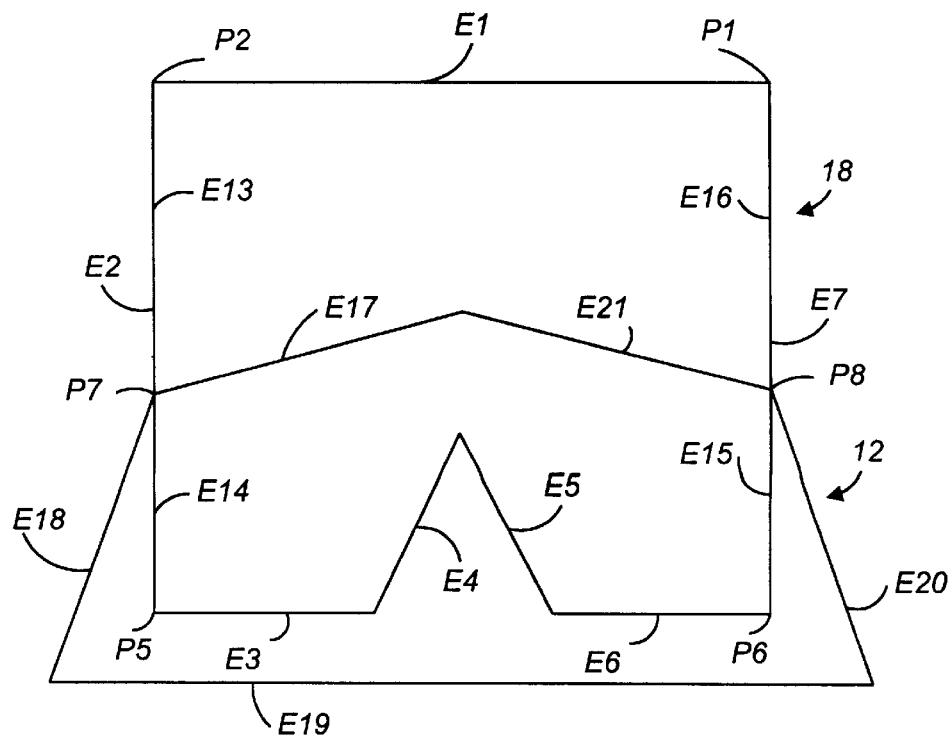
FIG. 2d is a diagram of the visible and invisible edges resulting from the application of a hidden line removal algorithm to two PostScript paths within one tile.

For example, referring to FIG. 2d, edge E2 of object 16 is split into edge E13 (with endpoints P2 and P7) and edge E14 (with endpoints P7 and P5), because edge E2 crosses a boundary of object 18 at point P7. Similarly, edge E7 of object 16 is split into edge E15 (with endpoints P6 and P8) and edge E16 (with endpoints P8 and P1) because edge E7 crosses the boundary of object 18 at point P8.

A complex point is a point at which more than two visible edges intersect. Referring to FIG. 2d, for example, point P7 is a complex point. A spline is a contiguous series of connected edges which do not cross an object boundary. A spline either begins and ends at a complex point or begins and ends at a single point. The hidden line removal method divides each object into splines, and identifies each of the edges of each object as being either visible or invisible. The edges of each invisible spline are then removed from the edge table.

For example, as a result of applying the hidden line removal method to the tile containing object 16 and object 18, object 16 is divided into two splines: one spline (S1) consisting of edges E13, E1, and E16, and one spline (S2) consisting of edges E14, E3, E4, E5, E6, and E15. Similarly, object 18 is divided into two splines: one spline (S3) consisting of edges E21 and E17, and one spline (S4) consisting of edges E18, E19, and E20. Splines S1, S3, and S4 are visible, as shown in FIG. 2c. Spline S2 is not visible.

After the hidden line removal method has identified the visible and invisible edges in a tile, the first visible edge e in object o is selected (step 26). If the original exterior color of edge e is unknown (step 30), then it is determined whether either endpoint of edge e is at a complex point (step 32). If either endpoint of edge e is at a complex point, then the exterior color and exterior sequence number of edge e are assigned values, according to the method of FIG. 3b (step 50). Steps 26–50 are then then repeated for each remaining visible edge in the tile.

Figure 3B:
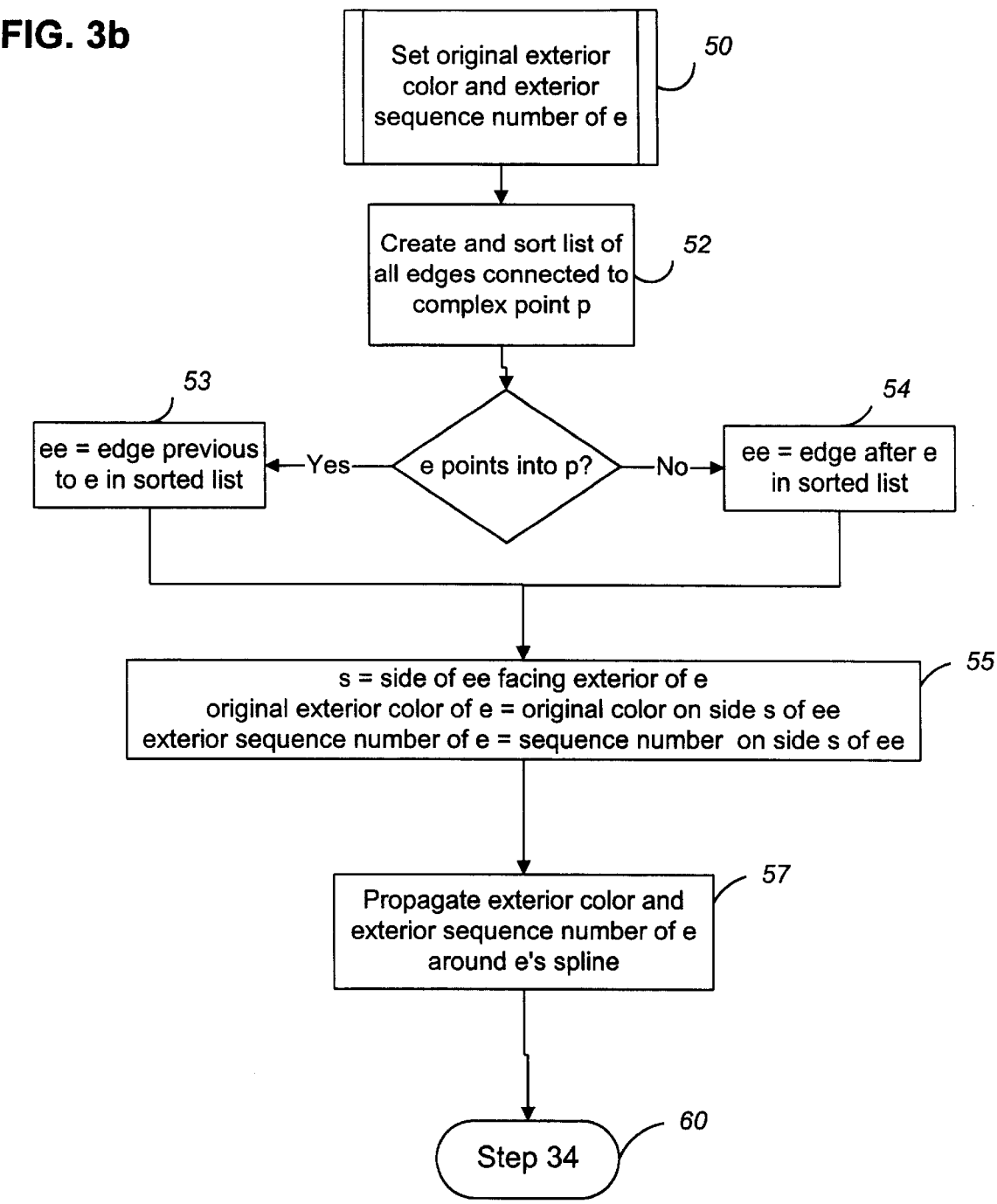

Referring to FIG. 3b, the original exterior color and exterior sequence number of an edge e that intersects with a complex point p are assigned values as follows. During hidden edge removal, a list of all visible edges connected to point p is maintained. First, the visible edges connected to point p are sorted (step 52). Edges are sorted in order of increasing angular direction (in a clockwise direction) with respect to point p. For purposes of sorting, the direction of each edge is treated as if the edge points away from point p. For example, the edges at point P8 (FIG. 2d) are sorted as follows: E20, E21, E16. Note that edge E15 is not included in the list because it was previously identified as invisible by the hidden line removal method. Next, if e points into point p, then ee is selected as the edge previous to e in the sorted list, with wraparound (step 53). If e points away from point p, then ee is selected as the edge following e in the sorted list, with wraparound (step 54). In other words, the edge previous to the first edge in the list is the last edge in the list, and the edge after the last edge in the list is the first edge in the list. For example, the edge previous to E21 is E20, and the edge, in the sort order, after E16 is E20.

Next, the original exterior color of e is set to the original color of ee on the side of ee facing the exterior of e, and the exterior sequence number of e is set to the sequence number of ee on the side of ee facing the exterior of e (step 55). For example, referring to FIG. 2d, if p is point P8 and e is edge E21, then ee is edge E7. The interior of edge E7 faces the exterior of edge E21. Therefore, the original exterior color of edge E21 is set to the original interior color of edge E7 (yellow), and the interior sequence number of edge E7 is copied into the exterior sequence number of edge E21.

The original exterior color and exterior sequence number of edge e are then propagated to the other edges in edge e's spline (step 57). The method then proceeds to step 34 in FIG. 3a (step 60).

Figure 2E:
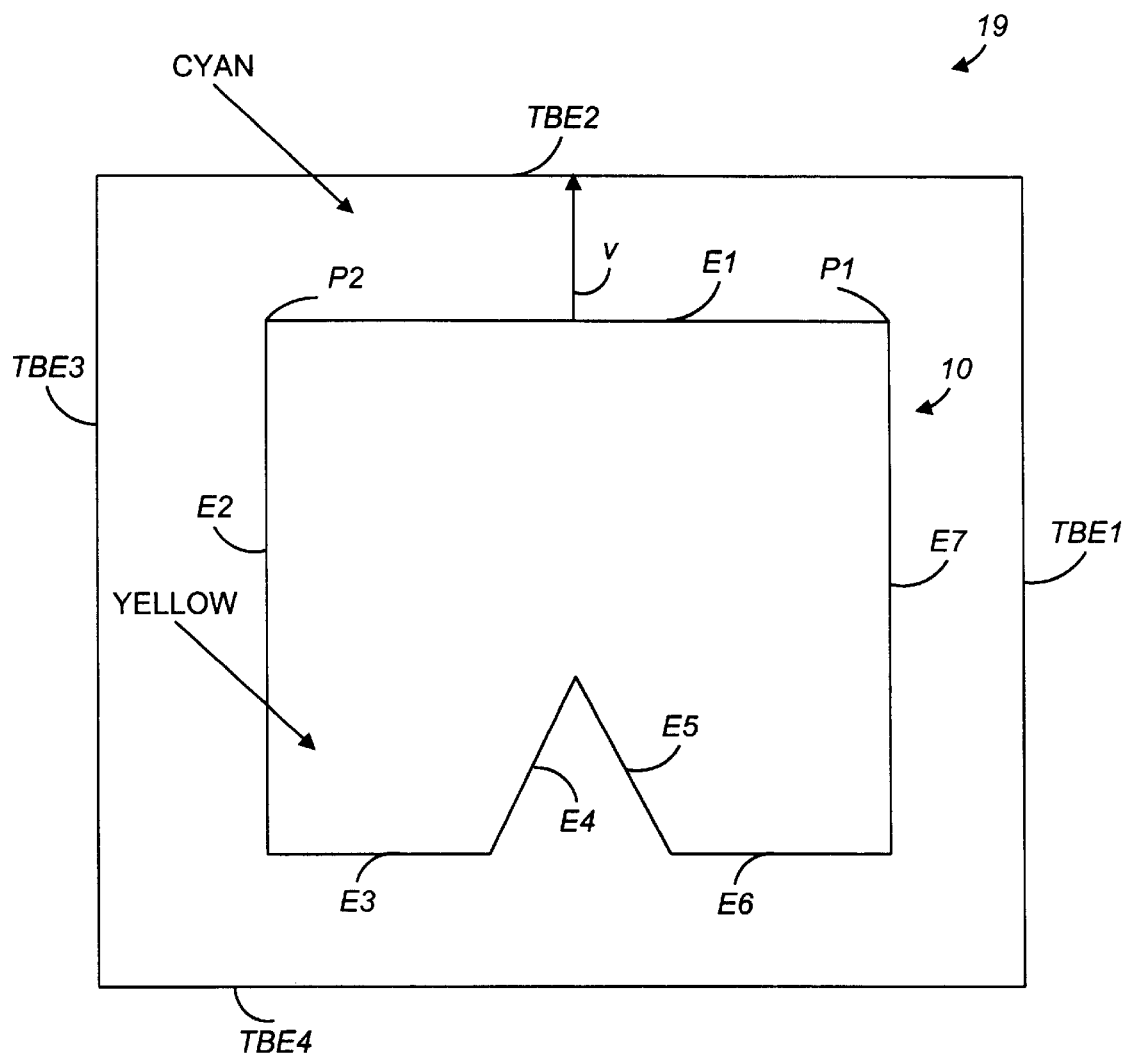
FIG. 2e is a diagram of a PostScript path within a tile, and of a vector used to identify the exterior color of the Post-Script path.
Figure 3C:
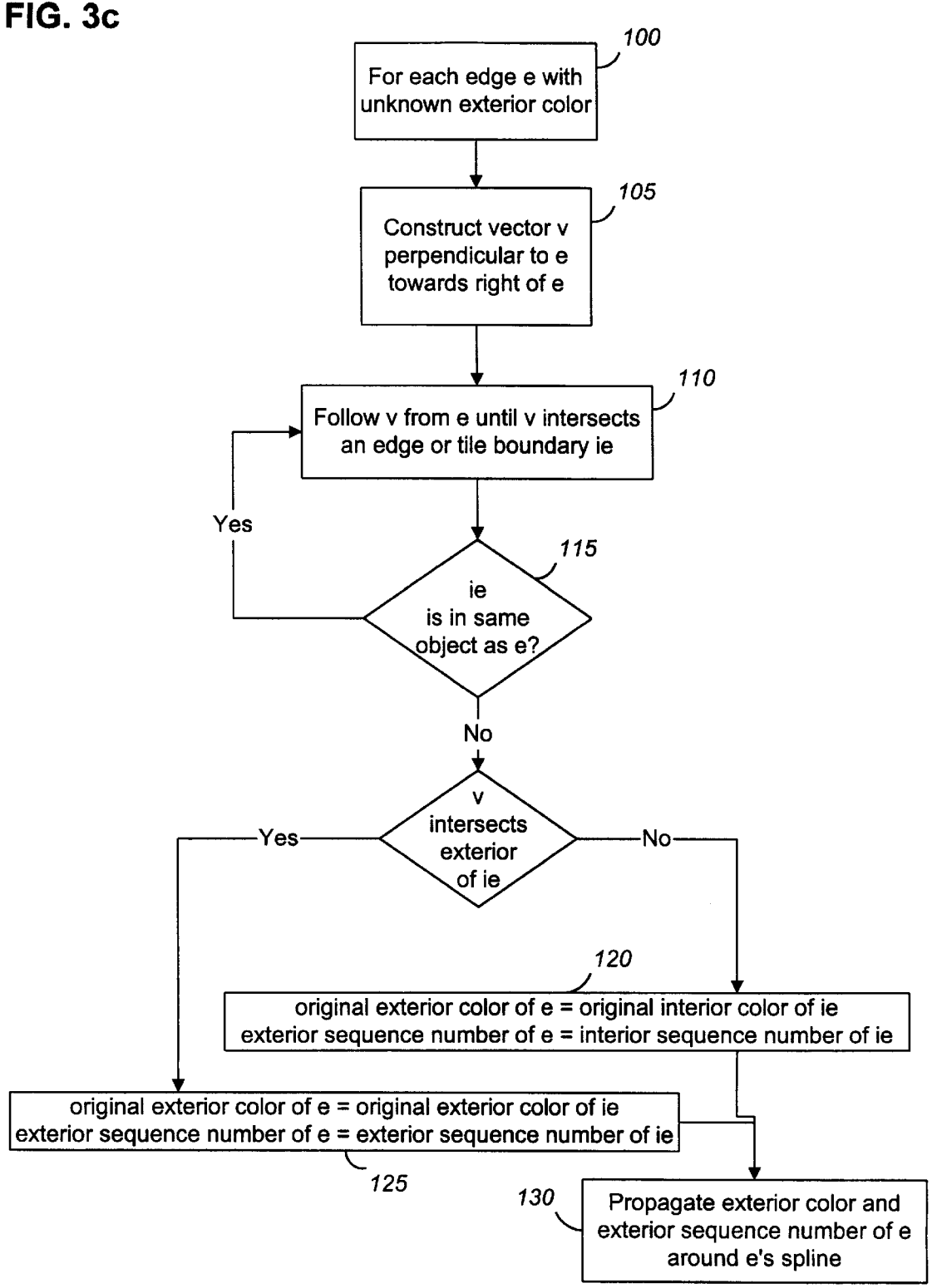

After the method of FIG. 3a has completed operation, the method of FIG. 3c is applied to all edges whose exterior color is still unknown. Referring to FIG. 2e, object 16 is the sole object within tile 19, with tile boundaries TBE1, TBE2, TBE3, and TBE4. Because none of the edges of object 16 intersects with the edges of any other objects or with any tile boundaries, the exterior color of all of the edges of object 16 will remain "unknown" after applying the method of FIG. 3a.

Referring to FIG. 3c, for each edge e with an unknown original exterior color (step 100), a vector v is constructed perpendicular to e, emanating from the midpoint of e, pointing towards the exterior of e (step 105). For example, referring to FIG. 2e, vector v is constructed perpendicular to edge E1 of path 16. The method next follows v until it intersects either an edge or a tile boundary (referred to as the intersected edge ie) (step 110) that is not in the same object as e (step 115). For example, referring to FIG. 2e, vector v intersects tile boundary TBE2. If v intersects the exterior of ie, then the original exterior color of e is assigned the value of the original exterior color of ie, and the exterior sequence number of e is assigned the value of the exterior sequence number of ie (step 125). Otherwise, the original exterior color of e is assigned the value of the original interior color of ie, and the exterior sequence number of e is assigned the value of the interior sequence number of ie (step 120). The original exterior color and exterior sequence number of e is then propagated to the other edges in e's spline (step 130). For example, referring to FIG. 2e, vector v intersects the interior of TBE2. The original exterior color of edge E1 is therefore assigned the value of the original interior color and the original interior sequence number of tile boundary TBE2, both of which are then propagated to edges E2, E3, E4, E5, E6, and E7.

Figure 4A:
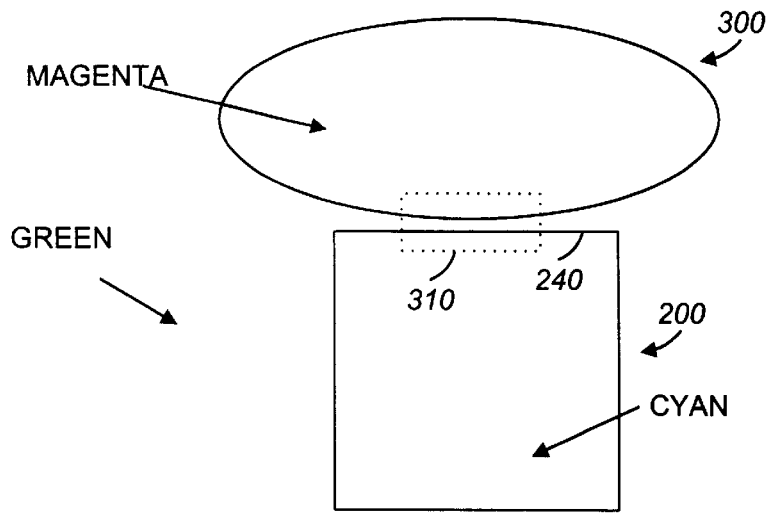
FIG. 4a is a diagram of two PostScript paths between which a peeker exists.

Referring to FIG. 4a, in their resolution-independent vector representations, object 200 and object 300 approach each other, but do not touch or overlap, near the top edge 240 of object 200. The interior color of object 200 is cyan, the interior color of object 300 is magenta, and the background color is green. Although not shown, the curve of object 300 is represented in vector form by a number of straight connected edges.

Figure 4B:
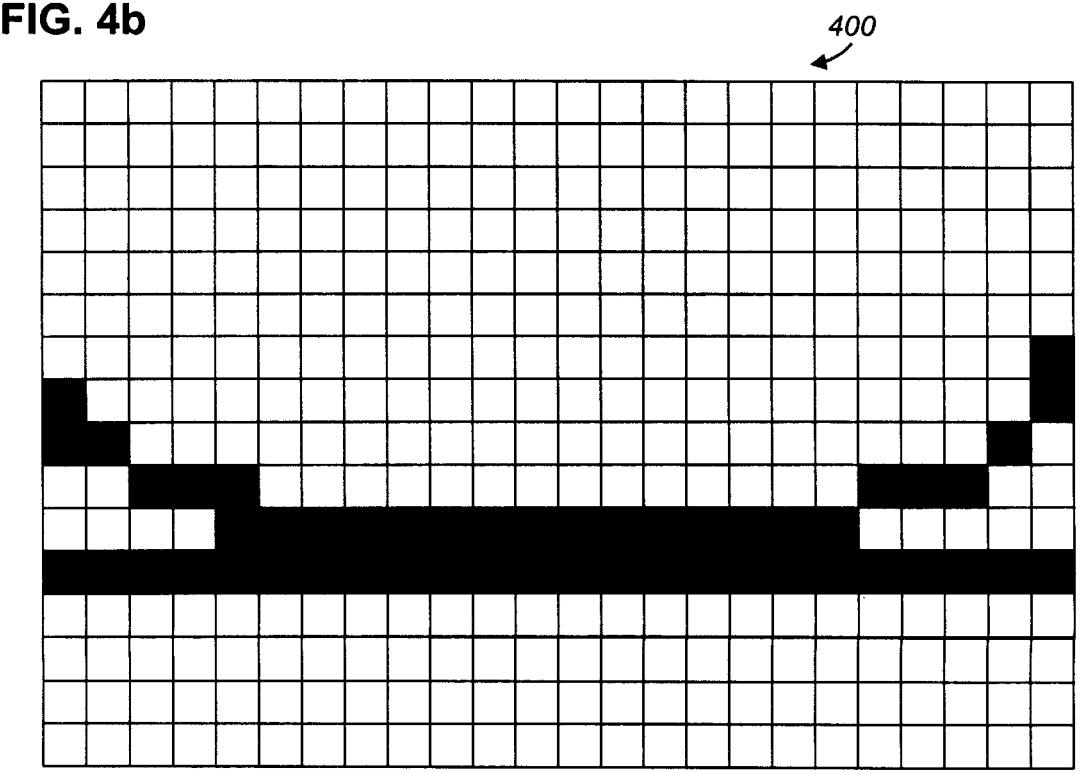
FIG. 4b is a diagram of a rasterization of parts of the two objects in FIG. 2a at the location of the peeker.

FIG. 4b shows a possible rasterization of the portions of objects 200 and 300 within the box 310, when rasterized on a device with a resolution smaller than the distance between the top edge 240 of object 200 and the bottom of object 300.

As shown in FIG. 4b, the pixels representing object 300 touch the pixels representing object 200, even though in their vector representations the objects do not touch or overlap. Therefore, although in the vector representation in FIG. 4a the color on the exterior of edge 240 is green (the background color), in rasterized form the color part of the exterior of edge 240 is magenta. Trapping edge 240 based solely on an exterior color of green will therefore lead to incorrect results. The methods and apparatus of the present invention provide proper trapping in this case, i.e., in the case where the raster representations of two objects touch even though their vector representations do not touch.

A peeker is a gap between two edges in vector representation that is narrower than a device pixel at the resolution of the output device on which the vectors are to be rendered. If a peeker exists between two edges, the color inside the gap between the two edges will not be visible when the page is rendered in rasterized form. If a peeker exists, the color between the two edges needs to be set to an appropriate color so that correct traps can be generated.

The peeker distance PD is defined as the maximum distance between two edges for which a peeker will be considered to exist. Trap width is the distance that a trap projects into the darker of two objects between which a trap is required. For a trap width of 0.25 points, PD is advantageously chosen to be twice the length of the shortest axis (highest dpi) of a pixel on the output device on which the page is to be rendered. PD may also be fixed as (max(h, v)/1200)*1, where h is the horizontal resolution of the output device in dots per inch, v is the vertical resolution of the output device in dots per inch, and 1 is the length of the shortest axis of a pixel on the output device. Other methods for calculating PD may also be used. For example, PD may be equal to 1 for resolutions of 0 through 900 dpi, 1.5*1 for resolutions of 900 through 1800 dpi, and (max(h, v)/1200)*1 for resolutions greater than 1800 dpi. For narrower trap widths, PD should be appropriately scaled down.

Figure 5:
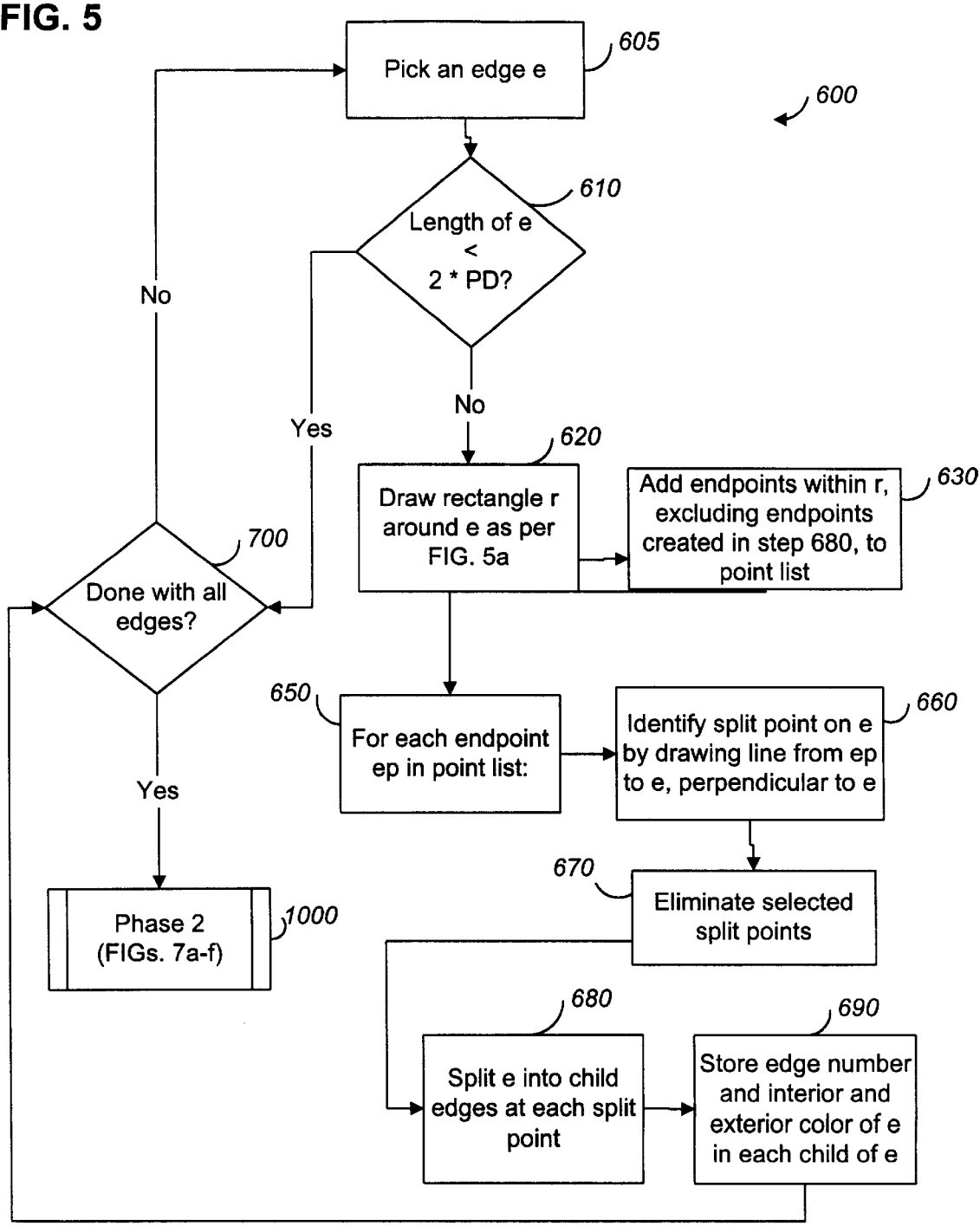
FIG. 5 is a flow diagram of Phase One of peeker detection and correction.
Figure 6A:
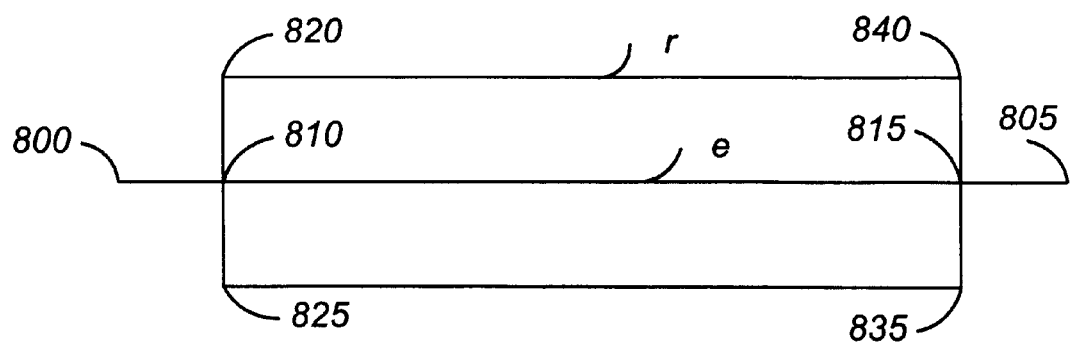
FIG. 6a is a diagram of a first peeker rectangle drawn around a first edge according to the method of FIG. 4.

Referring to FIG. 5, Phase One 600 of peeker detection and correction processes each of the edges in a tile as follows. First, an edge e is chosen from the tile's edge table (step 605). Edges may be chosen in any order. If edge e is less than two peeker distances long, then edge e does not need to be processed by Phase One (step 610). Otherwise, a rectangle r is constructed around edge e as shown in FIG. 6a (FIG. 5, step 620). Edge e has a from point 800 and a to point 805. Rectangle r has corners 820, 825, 835, and 840. Rectangle r is constructed so that PD is the distance between two points in each of the following pairs of points: (810, 820), (810, 825), (815, 835), (815, 840), (810, 800), and (815, 805).

Figure 6B:
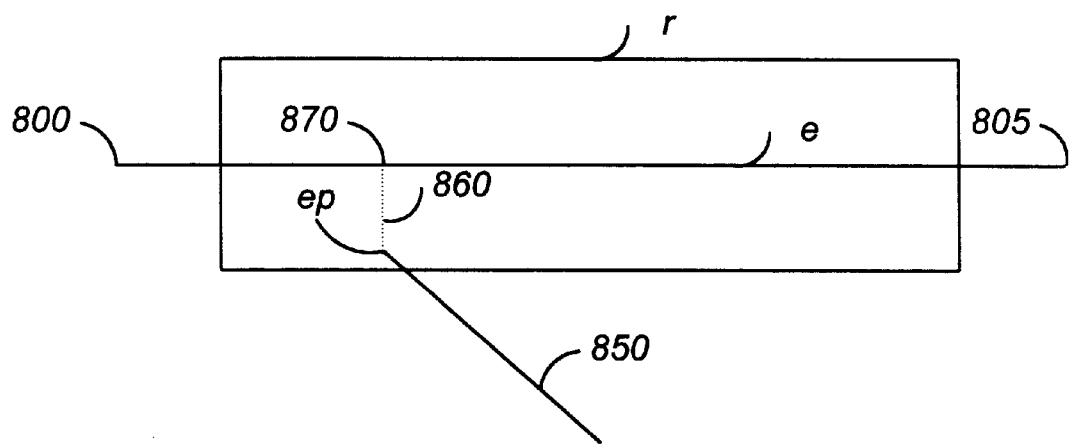
FIG. 6b additionally shows a second edge originating in the first peeker rectangle, and a resulting split point generated on the first edge.

Next, all edge endpoints falling within rectangle r, excluding any endpoints created in step 680, are added to a point list (step 630). Next, for each endpoint ep in the point list, a split point 870 on e is identified by drawing a line 860 from ep to e, in a direction perpendicular to e (step 660), as shown in FIG. 6b.

After split points for e have been identified, selected split points are eliminated so that no two split points are separated by a distance less than PD (step 670). Then, edge e is split into child edges at each split point (step 680). A reference to edge e is stored in each of edge e's child edges. Edge e's interior and exterior color are stored in each of edge e's child edges as the original interior color and original exterior color, respectively, of the child edge (step 690). After being split into child edges, edge e is removed from the edge table and is referred to as a parent edge. For example, referring to FIG. 6b, edge e is split into two child edges. One child edge has a from point at point 800 and a to point at point 870. The other child edge has a from point at point 870 and a to point at point 805.

If edge e was not the last edge in the tile, (step 700), the method of Phase One 600 is repeated for the remaining edges in the tile. After Phase One 600 has been completed, the method proceeds to Phase Two (step 1000).

Figure 7A:
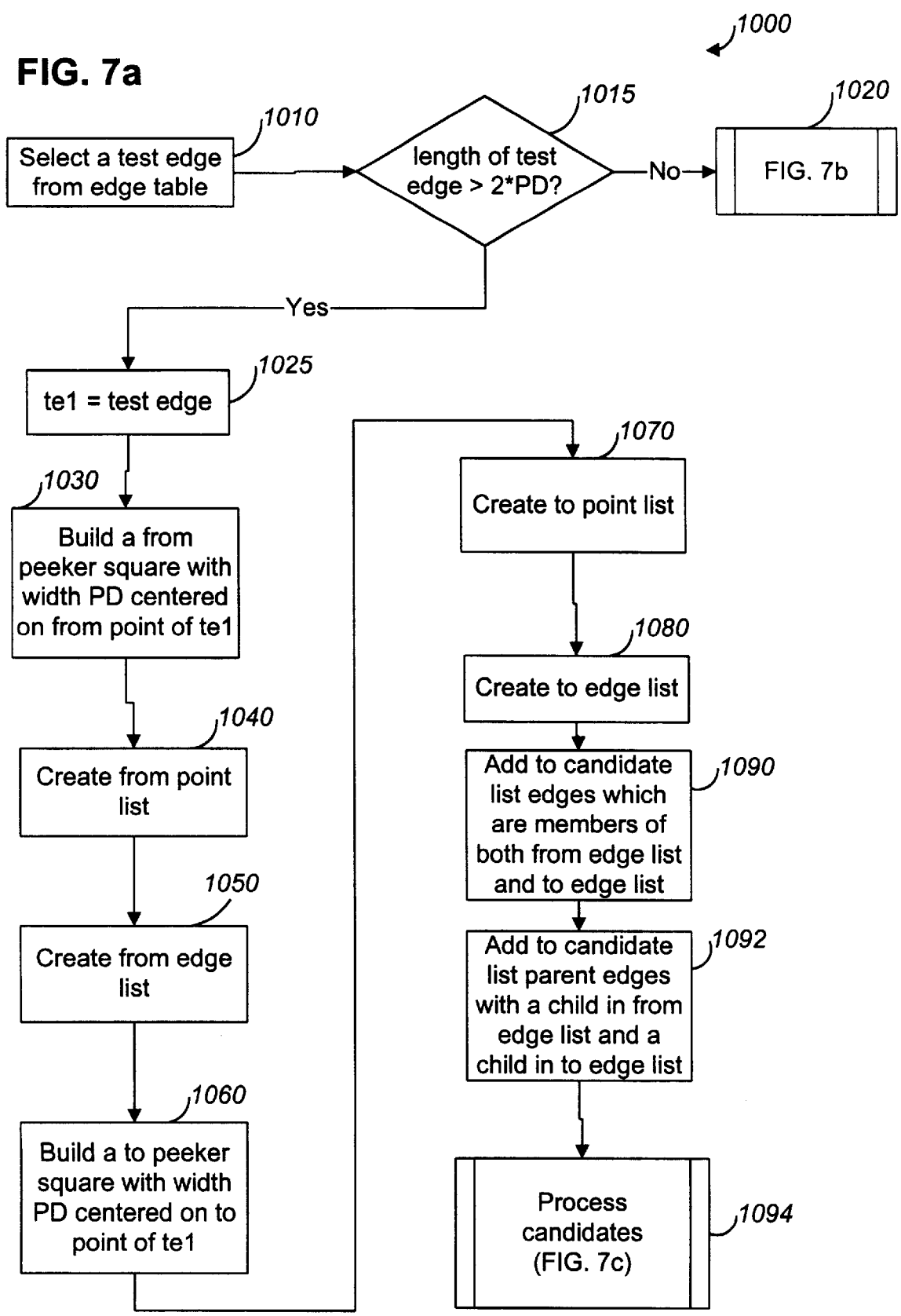
FIGS. 7a–f are flow diagrams of Phase Two of peeker detection and correction.
Figure 8A:
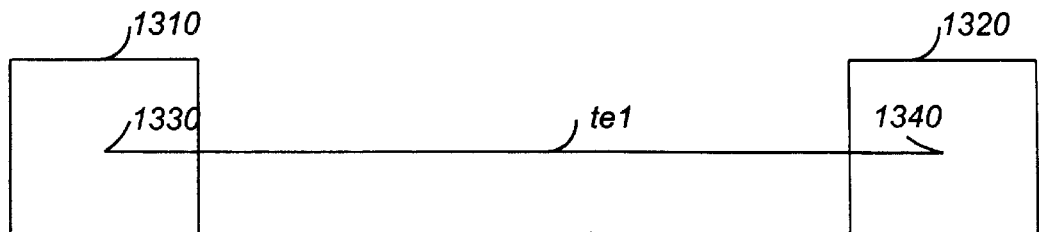
FIG. 8a is a diagram of two peeker squares drawn around the endpoints of an edge longer than twice the peeker distance.

Phase Two processes each of the edges in the edge table of a tile as follows. Referring to FIG. 7a, first a visible edge referred to as a test edge is selected from the edge table (step 1010). Visible edges may be selected as test edges in any order. If the length of the test edge is greater than twice the peeker distance (step 1015), then an edge object pointer te1 is set to point to the test edge (step 1025). Referring to FIG. 8a, te1 has a from point 1330 and a to point 1340. A square referred to as a from peeker square 1310, with width 2*PD, is drawn with its center on the from point 1330 of edge te1 (step 1030). Two parallel edges of the from peeker square 1310 are parallel to edge te1; the other two parallel edges of the from peeker square 1310 are perpendicular to edge te1.

Next, a from point list is created by examining the endpoints of each of the edges in the edge table (not including the endpoints of te1), and filling the from point list with each such endpoint which is within the from peeker square 1310 (step 1040). Then, all of the edges to which the points in the from point list belong are stored in a from edge list (step 1050). The steps 1030–1050 are then repeated for the to point 1340 of edge te1, using a to peeker square 1320 (steps 1060–1080).

After the from edge list and to edge list have been created, a list of candidate peeker edges (the candidate list) is created (steps 1090–1092). First, edges which are members of both the from edge list and the to edge list are added to the candidate list (step 1090). Next, parent edges with a child edge in the from edge list and another child edge in the to edge list are added to the candidate list (step 1092). For example, referring to FIG. 8b, edge 1360 has a from point 1362 in the to peeker square 1320 of edge te1 and a to point 1364 in the from peeker square 1310 of edge te1. Edge 1360 is therefore added to edge te1ls candidate list at step 1150. Edge 1366 is a parent edge. One child of edge 1366 has a from point 1368 in the from peeker square of edge te1 and a to point 1370. The other child of edge 1366 has a from point 1370, and a to point 1372 in the to peeker square of edge te1. The parent edge 1366 is therefore added to edge te1's candidate list at step 1160. Next, the candidates are processed according to the method of FIG. 7c (step 1094).

Figure 7B:
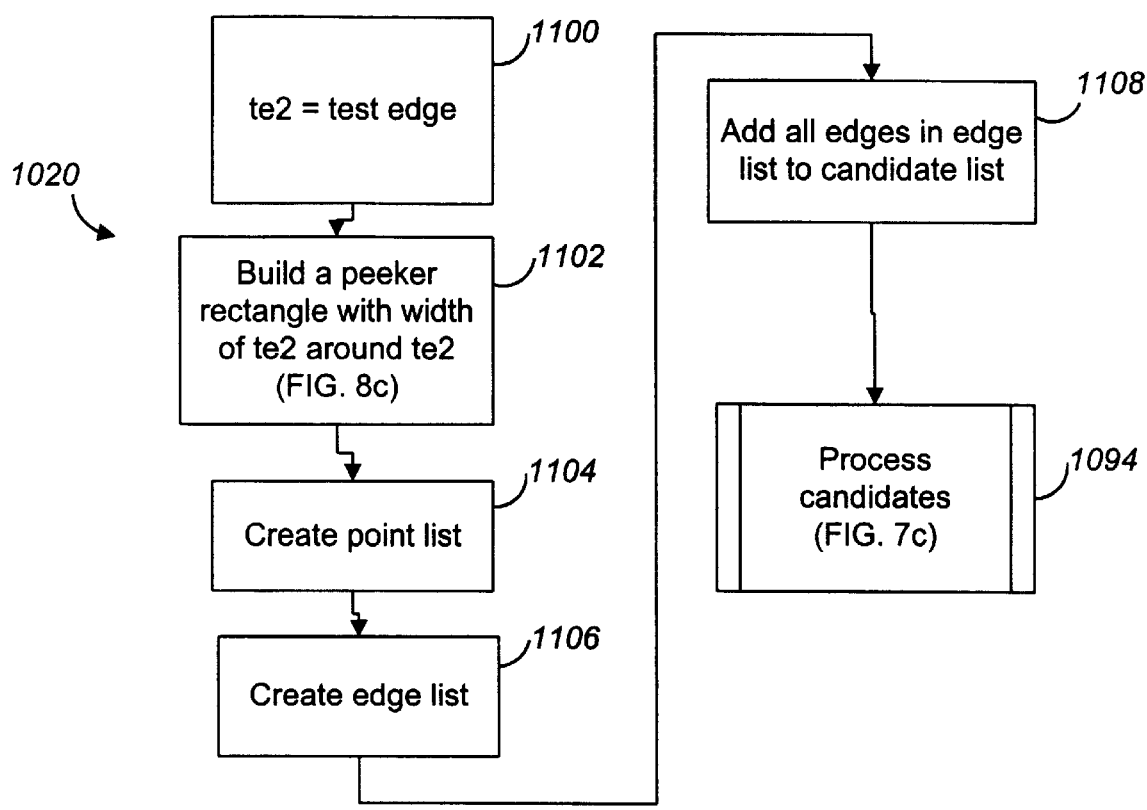

Referring to FIG. 7b, if the length of a test edge is less than or equal to 2*PD (step 1020), then an edge object pointer te2 is set to point to the test edge (step 1100). A single peeker rectangle 1350 is drawn around te2, as shown in FIG. 8c (step 1102). The width of the peeker rectangle 1350 is equal to the length of te2, and te2 divides the peeker rectangle 1350 into equal rectangular halves, each with height PD. A single point list of all endpoints in the peeker rectangle 1350, including the endpoints of te2, is created (step 1104), and a single edge list containing all edges with one or both endpoints in the point list is created (step 1106). The candidate list is then filled with all of the edges in the edge list (step 1108). For example, referring to FIG. 8d, edge 1380 has a from point 1382 and a to point 1384 in the peeker square 1350 of edge te2. Edge 1380 is therefore added to edge te2's candidate list at step 1108. Next, the candidates are processed according to the method of FIG. 7c (step 1094).

When an edge is placed in the candidate list, the following information about the edge is stored in a data structure: (1) a pointer to the candidate edge in the edge table; (2) the position of the candidate edge's from point in relation to the test edge (left, right, or colinear); (3) the position of the candidate edge's to point in relation to the test edge (left, right, or colinear); and (4) the difference in direction between the candidate edge and the test edge, as measured in radians.

Figure 7C:
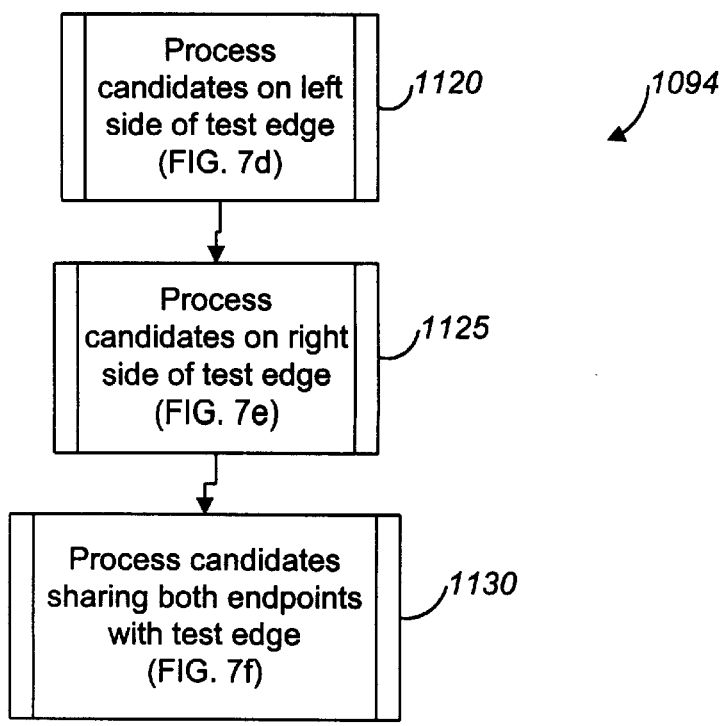
Figure 7D:
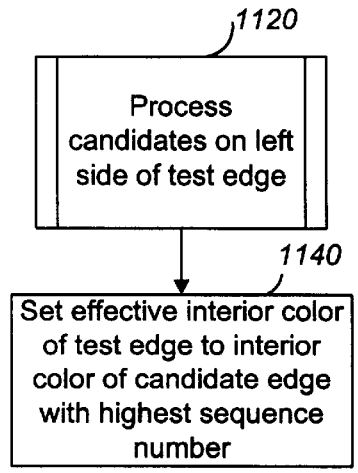
Figure 8B:
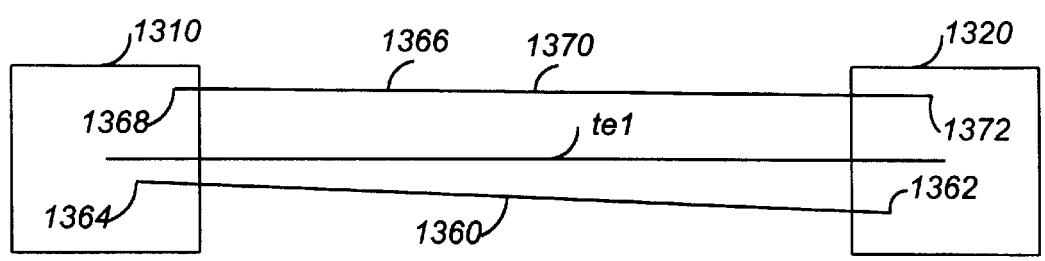
FIG. 8b additionally shows two additional edges, each of which has an endpoint in each peeker square.
Figure 8C:
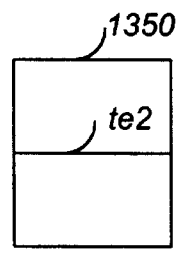
FIG. 8c is a diagram of a peeker rectangle drawn around an edge whose length is less than or equal to twice the peeker distance.
Figure 8D:
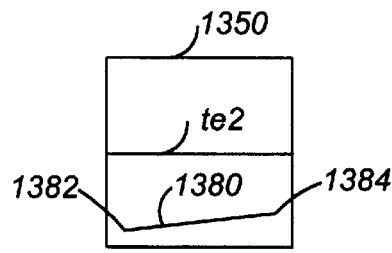
FIG. 8d additionally shows an additional edge having both endpoints within the peeker rectangle.

Referring to FIG. 7c, after the peeker candidate list has been created, each candidate edge in the candidate list is processed. First, candidate edges with at least one endpoint on the left side of the test edge and neither endpoint on the right side of the test edge are processed (step 1120). Specifically, referring to FIG. 7d, the effective interior color of the test edge is set to the interior color of the candidate edge with the highest owning sequence number, from among the candidate edges being processed (step 1140).

Figure 7E:
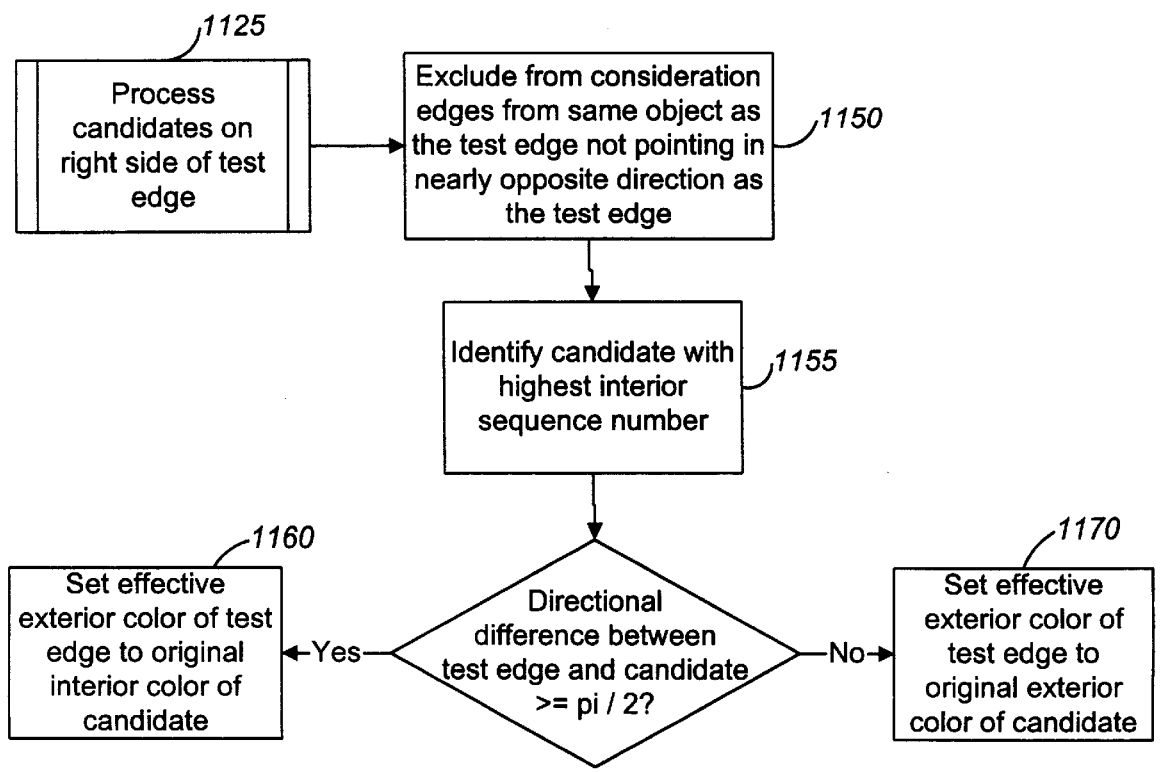

Next, candidate edges with at least one endpoint on the right side of the test edge and neither endpoint on the left side of the test edge are processed (step 1125; FIG. 7e). First, candidate edges from the same object as the test edge are excluded from consideration if they do not point in a direction nearly opposite to the test edge; specifically, they are excluded if the difference in direction is less then $3\pi/4$ radians or greater than $5\pi/4$ radians (step 1150). From the remaining candidate edges, the candidate edge with the highest interior sequence number is identified (step 1155). If the directional difference between the test edge and the identified candidate edge is greater than or equal to $\pi/2$ radians, then the effective exterior color of the test edge is set to the original interior color of the identified candidate edge (step 1160). If the directional difference between the test edge and the identified candidate edge is less than $\pi/2$ radians, the effective exterior color of the test edge is set to the original exterior color of the identified candidate edge (step 1170).

Figure 7F:
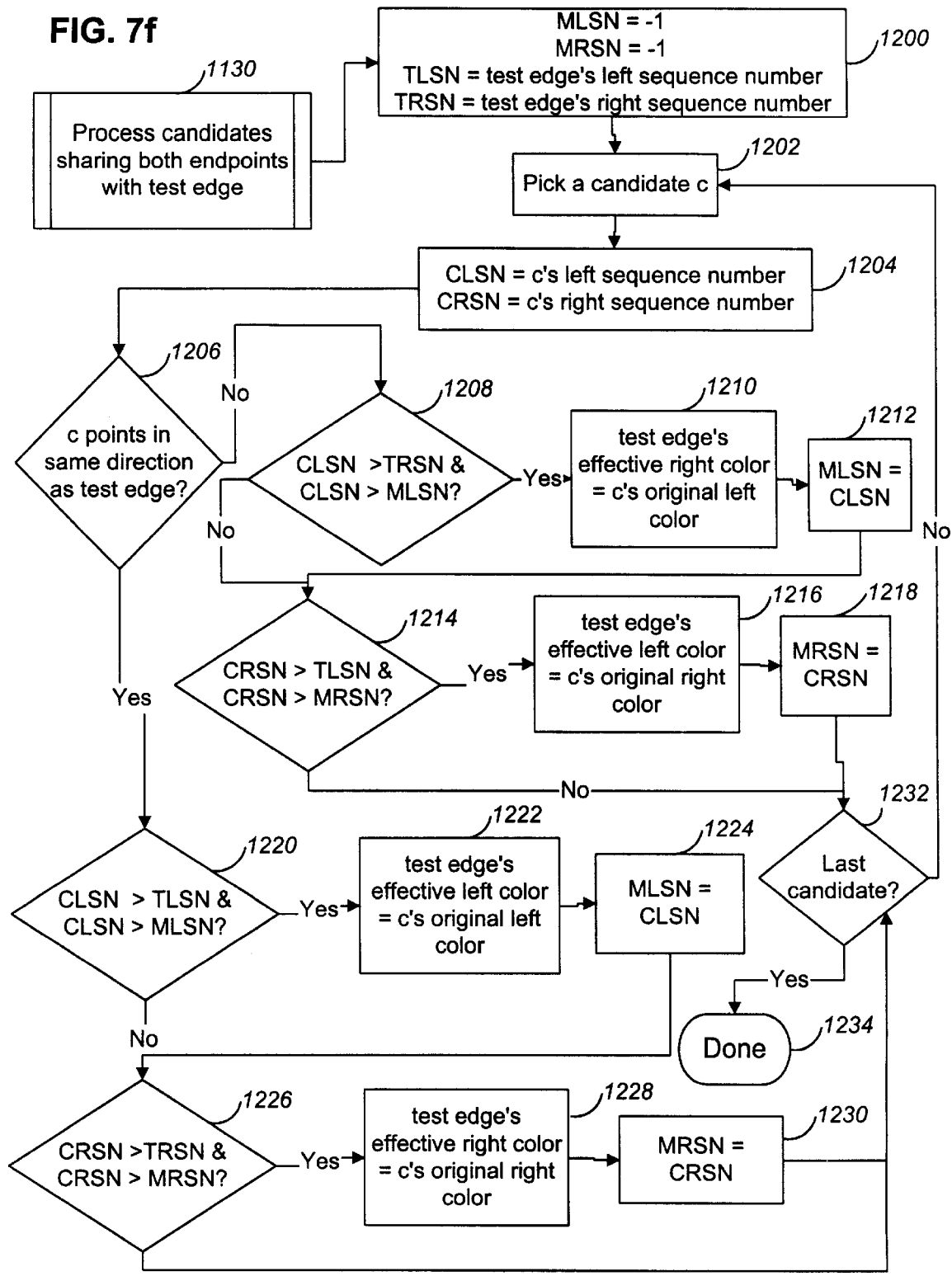

Next, referring to FIG. 7f, candidate edges which are coterminal with the test edge at both endpoints are processed (step 1130). First, variables MLSN (representing the highest candidate left sequence number encountered so far) and MRSN (representing the highest candidate right sequence number encountered so far) as initialized to −1 (step 1200). Variable TLSN is a pointer to the test edge's left sequence number, and TRSN is a pointer to the test edge's right sequence number (step 1200).

A candidate c is chosen (step 1202). Variable CLSN is assigned c's left sequence number, and variable CRSN is assigned c's right sequence number (step 1204). If c points in the same direction as the test edge (step 1206), CLSN>TLSN, and CLSN>MLSN, then the test edge's effective left color is assigned c's original left color, and MLSN is assigned the value of CLSN (steps 1220–1224). If c points in the same direction as the test edge (step 1206), CRSN>TRSN, and CRSN>MRSN, then the test edge's effective right color is assigned c's original right color, and MRSN is assigned the value of CRSN (steps 1226–1230).

If c points in the opposite direction as the test edge (step 1206), CLSN>TRSN, and CLSN>MLSN, then the test edge's effective right color is assigned c's original left color, and MLSN is assigned the value of CLSN (steps 1208–1212). If c points in the opposite direction as the test edge (step 1206), CRSN>TLSN, and CRSN>MRSN, then the test edge's effective left color is assigned c's original right color, and MLSN is assigned the value of CLSN (steps 1214–1218).

After peeker detection and correction has been performed, trapping can be performed using the effective interior and effective exterior colors of the edges on the page. Trapping will include deciding whether and where to place traps, and, if a trap is to be set, deciding what the color of the trap should be. Typically, a trap engine will examine the effective colors on both sides of each edge in an edge table to determine whether a trap is needed. If a trap is needed, the trap engine will then decide what color the trap should be. Trapping may be performed when the edges are in vector form, or it may be performed on the rasterized page.

Figure 9:
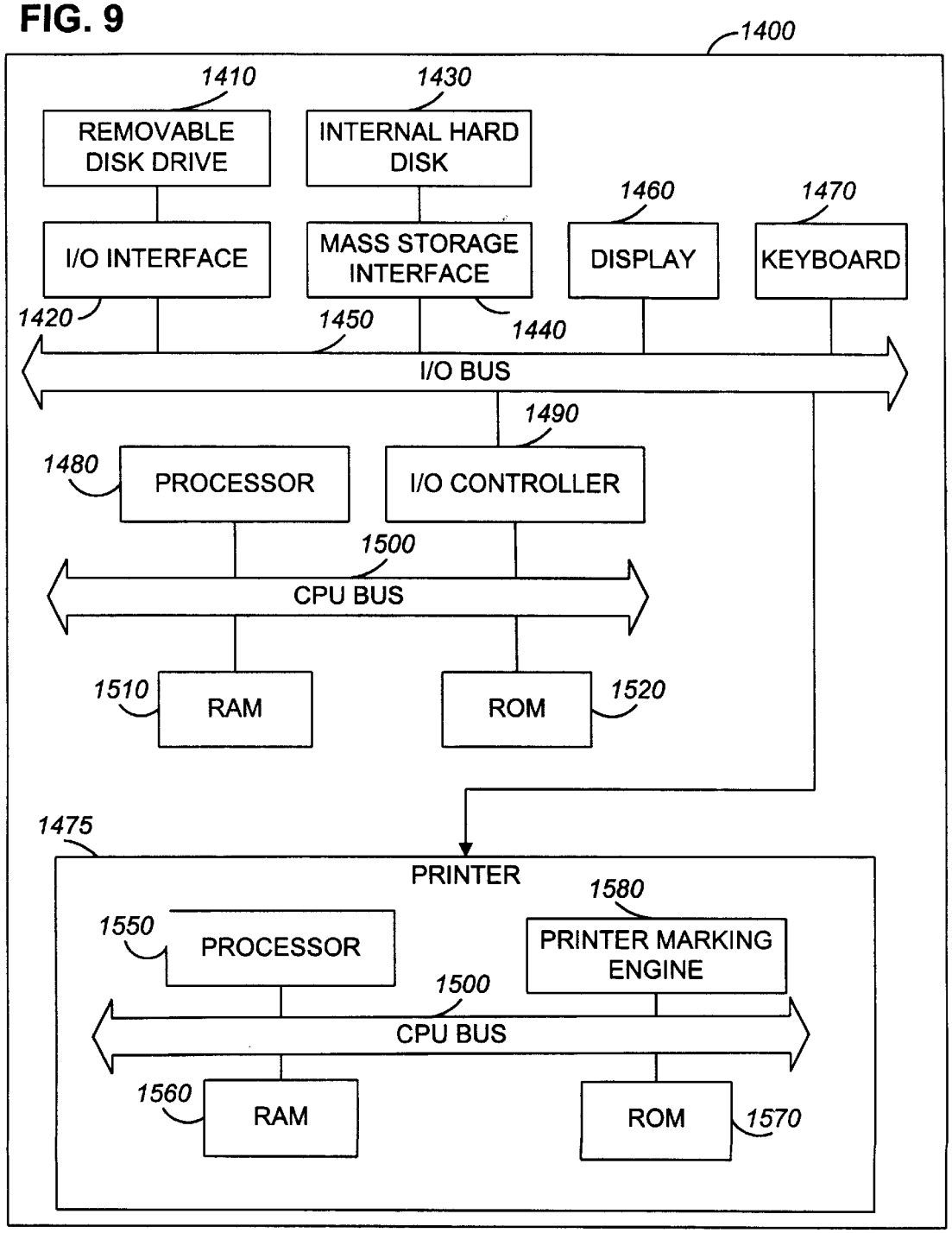
FIG. 9 illustrates a computer and computer elements suitable for implementing the invention.

Referring to FIG. 9, the invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output.

Suitable processors 1480 include, by way of example, both general and special purpose microprocessors. Generally, a processor will receive instructions and data from a read-only memory (ROM) 1520 and/or a random access memory (RAM) 1510 through a CPU bus 1500. A computer can generally also receive programs and data from a storage medium such as an internal disk 1430 operating through a mass storage interface 1440 or a removable disk 1410 operating through an I/O interface 1420. The flow of data over an I/O bus 1450 to and from I/O devices 1410, 1430, 1460, 1470 and the processor 1480 and memory 1510, 1520 is controlled by an I/O controller. User input is obtained through a keyboard 1470, mouse, stylus, microphone, trackball, touch-sensitive screen, or other input device. These elements will be found in a conventional desktop or workstation computer as well as other computers suitable for executing computer programs implementing the methods described here, which may be used in conjunction with any digital print engine 1475 or marking engine, display monitor 1460, or other raster output device capable of producing color or gray scale pixels on paper, film, display screen, or other output medium.

By way of example, a printing device 1475 implementing an interpreter for a page description language, such as the PostScript® language, includes a microprocessor 1550 for executing program instructions (including font instructions) stored on a printer random access memory (RAM) 1560 and a printer read-only memory (ROM) 1570 and controlling a printer marking engine 1580. The RAM 1560 is optionally supplemented by a mass storage device such as a hard disk (not shown).

Storage devices suitable for tangibly embodying computer program instructions include all forms of non-volatile memory, including by way of example semiconductor memory devices, such as EPROM, EEPROM, and flash memory devices; magnetic disks such as internal hard disks 1030 and removable disks 1410; magneto-optical disks; and CD-ROM disks. Any of the foregoing may be supplemented by, or incorporated in, specially-designed ASICs (application-specific integrated circuits).

Although elements of the invention are described in terms of a software implementation, the invention may be implemented in software or hardware or firmware, or a combination of any of the three.

The present invention has been described in terms of an embodiment. The invention, however, is not limited to the embodiment depicted and described. Rather, the scope of the invention is defined by the claims.

What is claimed is:

1. A method for processing a resolution-independent vector representation of a region to prepare the region for trapping prior to display on an output device, the region including a plurality of edges, each edge having two sides and each side having an associated original color, the method comprising:

finding a peeker between a first side of a first edge in the region and a second side of a second edge in the region, the peeker being a gap between two edges in the vector representation that is narrower than a device pixel at a resolution of the output device;

identifying a peeker color that will abut the first side of the first edge when the region is rendered for display on the output device; and changing the original color of the first side of the first edge to the peeker color prior to trapping the region for the output device.

2. The method of claim 1, wherein:

the region is a page.

3. The method of claim 1, wherein the resolution-independent vector representation includes a plurality of objects, each of which is defined by one or more closed directed paths consisting of ordered connected directed straight path edges, each object having an interior sequence number shared by each of the object's edges, and wherein the step of finding a peeker includes:

calculating a maximum distance between the first edge and the second edge; and identifying a peeker between the first edge and the second edge if the calculated maximum distance is less than a peeker distance.

4. The method of claim 3, wherein:

a rendered representation of the region is a rasterized form that includes pixels having dimensions; and the peeker distance is proportional to a dimension of the pixels.

5. The method of claim 4, wherein:

the peeker distance is approximately twice a length of a longest axis of a pixel.

6. The method of claim 4, wherein:

the peeker distance is approximately twice a length of a shortest axis of a pixel.

7. The method of claim 1 further comprising providing processed edges to a vector-based trapping engine for trapping.

8. The method of claim 1, further comprising:

selecting an edge in the region;

identifying an endpoint of a different edge within a peeker perimeter of the selected edge;

identifying as a splitting point on the selected edge a perpendicular projection of the endpoint onto the selected edge; and splitting the selected edge at the splitting point.

9. The method of claim 8, wherein:

the peeker perimeter is a rectangle having as its major axis the selected edge;

the steps of identifying an endpoint and identifying a splitting point are iterated over all different edge endpoints within the peeker perimeter;

split points are eliminated so that no two split points on the selected edge are separated by a distance less than a predetermined distance; and the step of splitting the selected edge is performed after split points are eliminated and before the step of finding a peeker.

10. The method of claim 1, wherein:

the first edge is one of the edges in a closed path of ordered directed edges having an interior and an exterior;

the first side of the first edge is on the exterior of the path and is the exterior side of the first edge;

the second edge is located on the exterior side of the first edge and the second side of the second edge faces the exterior side of the first edge; and identifying the peeker color comprises identifying a color of the second side of the second edge.

11. A method of identifying an exterior color to be associated with a first edge of a first path when the edge is rendered for display on an output device, the first edge included in a region and having a vector representation and an original exterior color, the method comprising:

determining if the first edge is in close proximity to a second edge of a second path in the region and forming the peeker therebetween, a peeker being a gap between the first edge and the second edge in the vector representation that is narrower than a device pixel at a resolution of the output device;

if a peeker is detected, determining an abutting color where the abutting color is a color associated with a side of the second edge of the second path opposite of the peeker;

changing the exterior color of the first edge to the abutting color prior to trapping the first edge for the output device.

12. A method for preparing a vector representation of edges to prepare a region for trapping when rendered into a rasterized form, the region having color transitions between the edges, comprising:

finding a peeker, the peeker being a gap between a first side of a first edge and a second side of a second edge in the region in the vector representation that is narrower than a device pixel at a resolution of an output device; and changing the color transitions between the edges for the peeker in the vector representation so that the color transitions match the color transitions that will be produced for the edges in the rasterized form.

13. A computer program tangibly stored on a computer-readable medium and operable to cause a computer to process resolution-independent vector representation of edges in a region to prepare the region for trapping when printed in a rasterized form on an output display device, each edge having two sides, each side having an original color associated with it, the computer program comprising instructions to:

find a peeker, the peeker being a gap between a first side of a first edge and a second side of a second edge in the region in the vector representation that is narrower than a device pixel at a resolution of the output device;

identify a peeker color that will abut the first side of the first edge in the rasterized form; and set an effective color of the first side of the first edge to the peeker color, where the effective color is used to determine if trapping as required for the first edge when rendered for output on the output display device.

14. The computer program of claim 13, wherein:

the region comprises a page.

15. The computer program of claim 13, wherein instructions to find a peeker further comprise instructions to:

calculate a maximum distance between the first edge and the second edge; and find a peeker between the first edge and the second edge if the calculated maximum distance is less than a peeker distance.

16. The computer program of claim 13, further comprising instructions to:

provide processed edges to a vector-based trapping engine for trapping.

17. The computer program of claim 13, further comprising instructions to:

select an edge in the region;

identify an endpoint of a different edge within a peeker perimeter of the selected edge;

identify as a splitting point on the selected edge a perpendicular projection of the endpoint onto the selected edge; and split the selected edge at the splitting point.

18. The computer program of claim 17, wherein:

the peeker perimeter is a rectangle having as its major axis the selected edge;

the instructions to identify an endpoint and identify a splitting point are iterated over all different edge endpoints within the peeker perimeter;

split points are eliminated so that no two split points on the selected edge are separated by a distance less than a predetermined distance; and the splitting of the selected edge is performed after split points are eliminated and preparatory to finding a peeker.

19. A computer program tangibly stored on a computer-readable medium and operable to cause a computer to identify an exterior color to be associated with a first edge of a first path when the edge is rendered for display on an output device, the first edge included in a region and having a vector representation and an original exterior color, the computer program including instructions to:

determine if the first edge is in close proximity to a second edge of a second path in the region and forming a peeker therebetween the peeker being a gap between the first edge and the second edge in the vector representation that is narrower than a device pixel at a resolution of the output device;

if a peeker is detected, determine an abutting color where the abutting color is a color associated with a side of the second edge of the second path opposite of the peeker;

change the exterior color of the first edge to the abutting color.

20. A computer program tangibly stored on a computer-readable medium and operable to cause a computer to prepare a vector representation of edges in a region for trapping when rendered into a rasterized form, the region having color transitions between the edges, the computer program including instructions to:

find a peeker, the peeker being a gap between a first side of a first edge and a second side of a second edge in the region in the vector representation that is narrower than a device pixel at a resolution of an output device; and change the color transition between the first and second edges for the peeker in the vector representation so that the color transition matches the color transition that will exist for the first and second edges when the first and second edges are rendered in the rasterized form.

* * * * *

UNITED STATES PATENT AND TRADEMARK OFFICE
CERTIFICATE OF CORRECTION

PATENT NO. : 6,366,361 B1  Page 1 of 1
DATED : April 2, 2002
INVENTOR(S) : Richard A. Dermer et al.

It is certified that error appears in the above-identified patent and that said Letters Patent is hereby corrected as shown below:

<u>Column 11,</u>
Line 66, please delete "the peeker therebetween, a peeker" and insert -- a peeker therebetween, the peeker -- therefor.

<u>Column 12,</u>
Line 40, please delete "trapping as" and insert -- trapping is -- therefor.

Signed and Sealed this

Eleventh Day of June, 2002

*Attest:*

*Attesting Officer*

JAMES E. ROGAN
*Director of the United States Patent and Trademark Office*